US012032927B2

United States Patent
Samuel et al.

(10) Patent No.: US 12,032,927 B2
(45) Date of Patent: Jul. 9, 2024

(54) PRODUCING IDIOMATIC SOFTWARE DOCUMENTATION FOR MANY PROGRAMMING LANGUAGES FROM A COMMON SPECIFICATION

(71) Applicant: Temper Systems, Inc., Dover, DE (US)

(72) Inventors: Michael Vincent Samuel, Princeton, NJ (US); Jasvir Nagra, Redwood City, CA (US)

(73) Assignee: Temper Systems, Inc., Dover, DE (US)

( * ) Notice: Subject to any disclaimer, the term of this patent is extended or adjusted under 35 U.S.C. 154(b) by 0 days.

(21) Appl. No.: 17/665,361

(22) Filed: Feb. 4, 2022

(65) Prior Publication Data
US 2022/0206759 A1   Jun. 30, 2022

Related U.S. Application Data

(63) Continuation of application No. 17/135,817, filed on Dec. 28, 2020, now abandoned.

(51) Int. Cl.
*G06F 8/10* (2018.01)
*G06F 8/41* (2018.01)
*G06F 8/51* (2018.01)

(52) U.S. Cl.
CPC .............. *G06F 8/10* (2013.01); *G06F 8/41* (2013.01); *G06F 8/51* (2013.01)

(58) Field of Classification Search
CPC ..... G06F 8/10; G06F 8/41; G06F 8/51; G06F 8/73
See application file for complete search history.

(56) References Cited

U.S. PATENT DOCUMENTS 4,864,569 A * 9/1989 DeLucia ................ G06F 8/71
714/38.1
6,257,774 B1 * 7/2001 Stack ..................... G06F 8/70
717/110

(Continued)

FOREIGN PATENT DOCUMENTS

WO   WO-2007013418 A1 * 2/2007 ............... G06F 8/73

OTHER PUBLICATIONS

Moser, Michael, Michael Pfeiffer, and Josef Pichler. "Towards reverse engineering of intermediate code for documentation generators." 2017 IEEE 24th international conference on software analysis, evolution and reengineering (Saner). IEEE, 2017. (Year: 2017).*

(Continued)

*Primary Examiner* — Matthew J Brophy
(74) *Attorney, Agent, or Firm* — NICHOLSON DE VOS WEBSTER & ELLIOTT LLP

(57) ABSTRACT

Computer-implemented techniques solve a number of problems with producing idiomatic software documentation for many programming languages from a common specification written in a common specification programming language. The techniques may be employed by a documentation generator computer program that translates the common specification into software programming interface documentation for each of many different programming language targets. The techniques may also be employed by a source-to-source compiler that incorporates the techniques to generate documentation from the common specification for each of many different programming language targets in addition to compiling the common specification into the different target languages.

20 Claims, 5 Drawing Sheets

(56) References Cited

U.S. PATENT DOCUMENTS

| | | | |
|---|---|---|---|
| 6,742,175 B1 | 5/2004 | Brassard | |
| 7,114,149 B2* | 9/2006 | Aptus | G06F 8/35 717/122 |
| 7,568,184 B1* | 7/2009 | Roth | G06F 8/74 717/123 |
| 7,992,139 B2* | 8/2011 | Chitgupakar | G06F 8/51 717/136 |
| 8,181,157 B2* | 5/2012 | Ericsson | G06F 9/454 717/123 |
| 9,043,758 B2* | 5/2015 | Frenkiel | G06F 8/73 717/123 |
| 9,557,974 B2* | 1/2017 | Goetz | G06F 8/425 |
| 9,880,817 B2* | 1/2018 | Tanguy | G06F 40/117 |
| 10,425,531 B1* | 9/2019 | Liu | H04M 7/0084 |
| 10,452,362 B2* | 10/2019 | Tanguy | G06F 40/131 |
| 11,036,482 B1* | 6/2021 | Samuel | G06F 8/31 |
| 11,157,271 B2* | 10/2021 | Danthalapelli | G06F 9/454 |
| 11,327,722 B1* | 5/2022 | Bahrami | G06F 8/311 |
| 11,372,625 B2* | 6/2022 | Tanguy | G06F 40/117 |
| 11,650,814 B1* | 5/2023 | Wadhwa | G06F 8/34 717/123 |
| 2002/0059564 A1* | 5/2002 | Bader | G06F 8/443 717/140 |
| 2002/0100014 A1* | 7/2002 | Iborra | G06F 8/35 717/136 |
| 2003/0167455 A1* | 9/2003 | Iborra | G06F 16/2365 717/105 |
| 2004/0268309 A1* | 12/2004 | Grover | G06F 8/20 717/120 |
| 2006/0004528 A1* | 1/2006 | Uehara | G06F 8/75 702/20 |
| 2006/0271920 A1* | 11/2006 | Abouelsaadat | G06F 8/41 717/137 |
| 2008/0127091 A1* | 5/2008 | Ericsson | G06F 9/454 717/123 |
| 2010/0037213 A1 | 2/2010 | Meijer et al. | |
| 2010/0146491 A1* | 6/2010 | Hirano | G06F 8/73 717/137 |
| 2011/0271247 A1* | 11/2011 | Hedley | G06F 8/51 717/137 |
| 2013/0042258 A1 | 2/2013 | Rector et al. | |
| 2016/0048606 A1* | 2/2016 | Rubinstein | H04N 21/8355 715/234 |
| 2016/0140036 A1 | 5/2016 | O'Meara et al. | |
| 2017/0262265 A1* | 9/2017 | Kellicker | G06F 8/51 |
| 2018/0067836 A1* | 3/2018 | Apkon | G06F 8/34 |
| 2018/0196651 A1* | 7/2018 | Dettinger | G06F 8/51 |
| 2020/0285454 A1* | 9/2020 | Antonevich | G06F 8/427 |
| 2020/0379739 A1 | 12/2020 | Bhownani et al. | |
| 2020/0387415 A1* | 12/2020 | Take | G06Q 50/10 |
| 2021/0240453 A1* | 8/2021 | Badlani | G06F 8/42 |
| 2021/0263732 A1* | 8/2021 | Luo | G06F 8/77 |
| 2021/0357210 A1* | 11/2021 | Clement | G06N 3/084 |
| 2022/0100477 A1* | 3/2022 | Mosko | G06F 8/658 |

OTHER PUBLICATIONS

Geist, Verena, et al. "Leveraging machine learning for software redocumentation." 2020 IEEE 27th International Conference on Software Analysis, Evolution and Reengineering (Saner). IEEE, 2020. (Year: 2020).*

Dorninger, Bernhard, Michael Moser, and Josef Pichler. "Multi-language re-documentation to support a COBOL to Java migration project." 2017 IEEE 24th international conference on software analysis, evolution and reengineering (Saner). IEEE, 2017. (Year: 2017).*

Moser, Michael, et al. "Rbg: A documentation generator for scientific and engineering software." 2015 IEEE 22nd International Conference on Software Analysis, Evolution, and Reengineering (Saner). IEEE, 2015. (Year: 2015).*

Altassian, "How to Choose the Best Source Code Repository", https://bitbucket.org/product/code-repository, Sep. 30, 2020, 11 pages.

Anonymous, "Doxygen—Wikipedia", Retrieved from <https://en.wikipedia.org/w/index.php?title=Doxygen&oldid=891955414>, Apr. 11, 2019, 5 pages.

Final Office Action, U.S. Appl. No. 17/135,817, dated Aug. 6, 2021, 25 pages.

Germain, "Commenting", Utah University, Apr. 9, 2010, web.archive.org/web/20100409154705/https://www.cs.utah.edu/~germain/PPS/Topics/commenting.html, Accessed on Feb. 27, 2021, 5 pages.

Github Documentation, "Code Examples in Multiple Languages", sublime-and-sphinxguide.readthedocs.io/en/latest/code_blocks.html#code-examples-in-multiplelanguages, last viewed on Dec. 29, 2020, 6 pages including statement of relevance.

Gradle, "Publishing a Project as Module", Version 6. 7.1, https://docs.gradle.org/current/userguide/publishing_setup.html, Nov. 28, 2020, 8 pages.

HowTo, "Program Library Howto: Shared Libraries", Version 1.20, https://tldp.org/HOWTO/Prograrn-Library-HOWTO/shared-libraries.html, Apr. 11, 2003, 8 pages.

International Search Report and Written Opinion, PCT App. No. PCT/US2021/065236, dated May 2, 2022, 11 pages.

Maven Central Repository Search, "Guava: Google Core Libraries for Java", https://search.maven.org/artifact/com.google.guava/guava/30.0-jre/bundle, last viewed on Dec. 29, 2020, 2 pages including statement of relevance.

Non-Final Office Action, U.S. Appl. No. 17/135,817, dated Mar. 19, 2021, 26 pages.

Van Heesch, Dimitri, "Doxygen—Manual for Version 1.8.7", Retrieved from <https://www.lrz.de/services/software/programmierung/doxygen/manual.pdf>, 2014, 224 pages.

* cited by examiner

PRODUCING IDIOMATIC SOFTWARE DOCUMENTATION FOR MANY PROGRAMMING LANGUAGES FROM A COMMON SPECIFICATION

BENEFIT CLAIM

This application claims the benefit as a continuation of application Ser. No. 17/135,817, filed Dec. 28, 2020, by Michael Vincent Samuel et al., the entire contents of which is hereby incorporated by reference. The applicant hereby rescinds any disclaimer of claim scope in the parent application or the prosecution history thereof and advise the USPTO that the claims in this application may be broader than any claim in the parent application.

TECHNICAL FIELD

The present disclosure relates to computer programming languages. More specifically, the present disclosure relates to computer-implemented techniques for producing idiomatic software documentation for many programming languages from a common specification.

BACKGROUND

Computers are very powerful tools for performing a wide variety of tasks. Computer programs are a common mechanism for accomplishing custom processing tasks using computer systems. A typical program is a set of programmed instructions (source code) that is compiled into an executable form. The executable form is then executed by a computer system to accomplish a task. For example, a set of C programming language instructions may be compiled into a set of x86 processor-executable instructions. The set of processor-executable instructions may then be executed by an x86-compatible processor to accomplish a processing task.

Between the set of programmed instructions as programmed by a human computer programmer and the executable form, a compiler is typically used as a translator. In essence, the compiler shields the programmer from knowing or even caring about underlying executable form details. Typically, all programmed instructions authored by programmers are translated by the compiler. For example, the compiler may perform data type checking, symbol table construction, register allocation, and instruction scheduling, all without programmer knowledge of the underlying compiler implementation. In this manner, the compiler provides programmers with a tool to reason about and express a processing task at a higher-level using a high-level programming language that alleviates the programmer from the cognitive burden of worrying about low-level execution details. The general construction and operation of compilers is well known in the art. See, e.g., Aho, A., Sethi, R., and Ullman, J.; "Compilers: Principles, Techniques, and Tools," Second Edition, 2007.

One purpose of some compilers is cross-compilation. A cross-compiler may be defined as a compiler that produces two or more many outputs from one input where the outputs are closer to the final executable forms than the input. For example, a cross-compiler may accept as input source code written a source programming language that is both human and computer-readable and produce multiple different executable forms of the source code as outputs. Consider, for instance, a cross-compiler for the C programming language. Such a cross-compiler might produce from C source code an x86 executable (e.g., for execution on computers configured with the MICROSOFT WINDOWS operating system), an ARM executable (e.g., for execution on mobile computing devices configured with the ANDROID operating system), and a WASM executable (e.g., for execution on a virtual stack machine supported by a web browser application).

There are also source-to-source compilers. A source-to-source compiler may be defined as a compiler that accepts as input source code written in a source programming language that is both human and computer-readable and outputs source code for one or more multiple different programming language targets that each are also each both human and computer readable. The different programming targets may then be further compiled by respective compilers into executable form. For example, the HAXE compiler can translate source code written in the HAXE programming language into a handful of structurally similar programming language targets. More information on HAXE is available on the Internet in the haxe.org Internet domain.

Different programming language communities use different toolsets for generating documentation for software programming interfaces. For example, the JAVA programming language community uses the JAVADOC documentation generator, the PYTHON programming language community uses the PYDOC documentation generator, the C++ programming language community uses the DOXYGEN documentation generator, etc. Each documentation generator generates documentation in a different form. As a result, members of the different communities expect software programming interface documentation to be formatted in different ways that vary depending on the particular programming language at hand.

The techniques disclosed herein address this and other issues.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The techniques are illustrated by way of example, and not by way of limitation, in the figures of the accompanying drawings and in which like reference numerals refers to similar elements and in which.

SUMMARY

Figure 1:
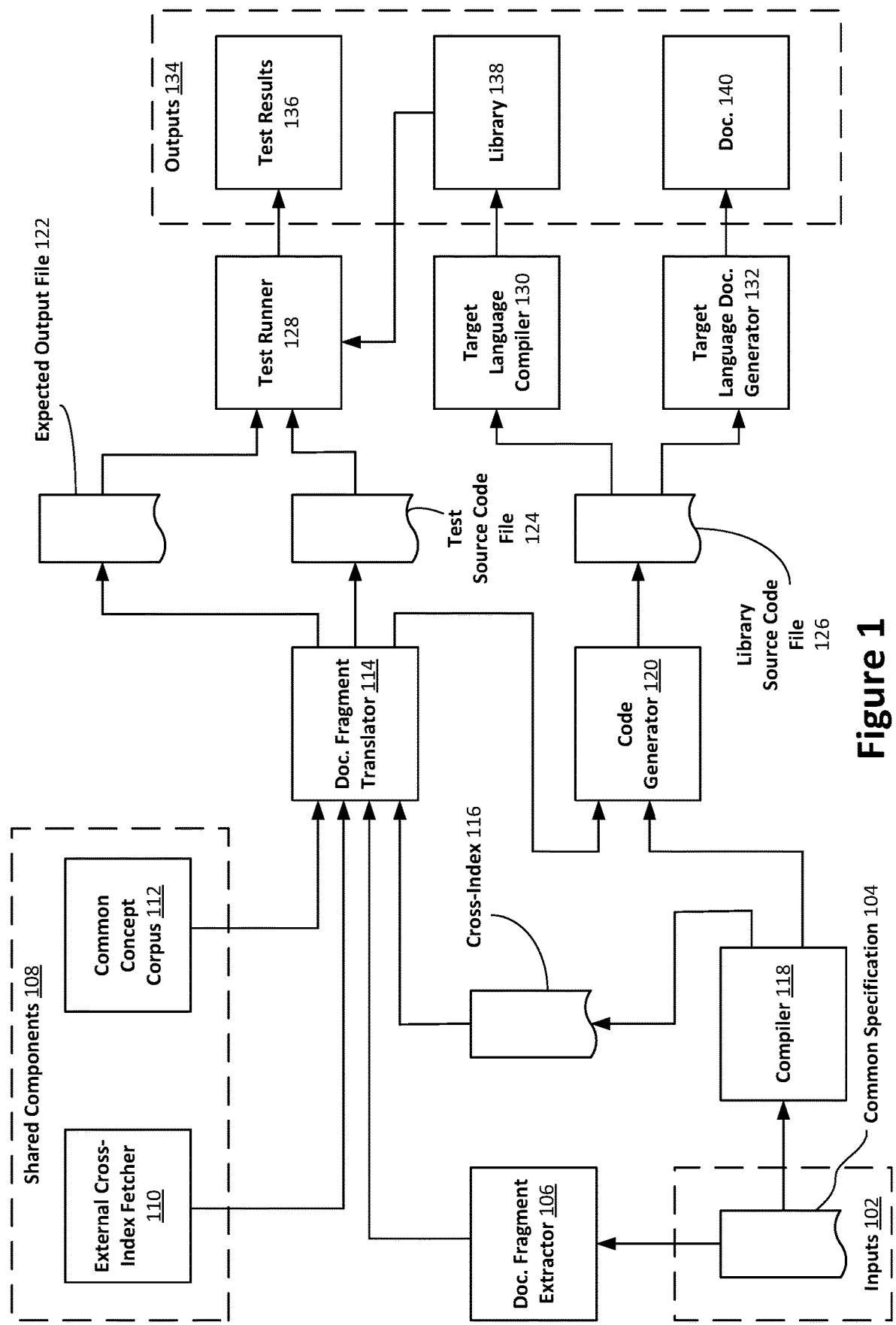
FIG. 1 is a schematic diagram of a software documentation generation system for producing idiomatic software documentation for many programming languages from a common specification.

The General Overview section of the Detailed Description below provides a useful overview of the techniques for producing idiomatic software documentation for many programming languages from a common specification.

DETAILED DESCRIPTION

In the following description, for the purposes of explanation, numerous specific details are set forth to provide a thorough understanding of the techniques. It will be apparent, however, that the techniques may be practiced without these specific details. In other instances, well-known structures and devices are shown in block diagram form to avoid unnecessarily obscuring the techniques.

Glossary

The following definitions are provided for illustrative purposes, not limitation, to aid in understanding of the disclosure of the techniques:

Clearly Structured Text: The term "clearly structured text" is structured text that persons without special training can decipher, but which also is machine interpretable. For example, in the following example micro-blogging service message "@catlover, your pictures from 2020 Sep. 30 are available at https://cat.photos", the text "@catlover", the Industry Standards Organization (ISO) formatted date, and the URL are meaningful to both machines, and humans without special training.

Cross-Compiler: A "cross-compiler" is a compiler that produces two or more many outputs from one input.

Compiler: A "compiler" consumes an input suitable for both human and machine consumption such as, for example, a computer program or a computer program library written in a common specification programming language, and produces an output more suitable for machine consumption such as, for example, a target computer program executable, a linkable or loadable computer program library for a target computer programming language runtime, or source code in a target computer programming language.

Documentation Generator: A "documentation generator" is a computer program that produces human readable documents in a data format such a HyperText Markup Language (HTML), PDF, or POSTSCRIPT. The documentation generator produces the documentation by deconstructing, cross-indexing, and rearranging passages of text from a variety of sources. Such sources (also called "documentation input" herein) may include source code files written a computer programming language; documentation input files in a format such as markdown or HTML; media files from which figures, diagrams, and other non-textual content can be derived including binary image formats such as PNG and JPEG, along with textual descriptions of images like SVG and DOT; documentation metadata files that provide hints to help organize content into groupings like chapters and explain how to find and link to files across organization boundaries like documentation generated from another project which explains concepts used by the documented software; stylistic files that explain how documentation should appear including Cascading Style Sheets (CSS) that can control colors and font sizes of text, and typographic font files that define the shape (glyphs) of each letter rendered using a particular font.

Interrupted Prose: The term "interrupted prose" or "interrupted text" may refer to a passage of text that would be prose if all the unclear fragments it contains were replaced with contextually valid clearly structured text or prose.

Library: A "library" may be defined as the expression of an algorithm or algorithms in an automatable form. An example of an automatable form may be programming language code or a compiled version thereof (e.g., as bytecode, binary-executable code, etc.). Typically, when executed as a process or processes, the library does not "own" the process(es) of which it executes as a part of. Instead, a library executes alongside or as part of a larger system that delegates specific kinds of algorithmic tasks to the library. For example, a microservice on a computer network may be viewed as a library. Microservices often exist for other network nodes to delete specific algorithmic tasks to.

Prose: The term "prose" refers to text in a human language meant for communication primarily by humans, as opposed to a program written in a programming language.

Runtime: A "runtime" for a programming language encompasses computational mechanisms that support execution of computer programs written in that language. For example, a runtime for a programming language may encompass a virtual machine that understands the bytecode instructions to which that language's computer programs are compiled. The JAVA virtual machine (JVM) is but one example of such a runtime. In addition, the term "runtime" or the phrase "at runtime" is sometimes used herein to refer to the time when a computer program is executed.

Source Code: The term "source code" may refer to structured text encompassing statements, expressions, and commands expressed in a computer programming language.

Structured Text: The term "structured text" may refer to text that is machine interpretable and that persons without special training may have trouble understanding. For example, in the text "Use {@link MyClass#method(int, int)} to do XYZ", the text between the curly brackets is structured according to a punctuation-dense micro-language that requires specialized knowledge for a human to decode.

Target: A "target" may be defined as a mechanism used by a client to connect to a compiler output. A programming language can be a target; a programmer writes code to connect to a library that loads into the same memory space. A virtual machine (VM) can be a target; a programmer can write code that compiles to the kind of bytecode that the virtual machine runs and rely on the VM to link uses via the interface. Another program may be a client. Accordingly, inter-program mechanisms are targets; code may use inter-process communication (IPC), remote procedure calling (RPC), or RESTful network protocols to send a message to something running outside the client program's process such as, for example, a network service or a microservice, and recognize when an incoming message contains a response.

General Overview

Computer-implemented techniques disclosed herein solve a number of problems with producing idiomatic software documentation for many programming languages from a common specification written in a common specification programming language. The techniques may be employed by a documentation generator computer program that translates the common specification into software programming interface documentation for each of many different programming language targets. The techniques may also be employed by a source-to-source compiler that incorporates the techniques to generate documentation from the common specification for each of many different programming language targets in addition to compiling the common specification into the different target languages.

One problem solved by techniques disclosed herein is that software programming interface documentation is not just prose. For example, documentation may contain source code examples. When generating software programming interface documentation for many different target programming languages from a common specification, the different sets of documentation should include source code fragments translated from the common specification into source code fragments for the different programming language targets.

A related problem is that documentation may have embedded structured text that is authored by a programmer inline with prose. For example, consider the following example multi-line source code comment block containing embedded structured text inline with prose:

```
01:  /**
02:   * Be careful not to over-tighten bolts! Doing so can lead to failure of
03:   * structural elements! By default, the BoltTightener tightens to [inline
04:   * DEFAULT_MAX_TORQUE_VALUE]. If this is too high use
05:   * {@link BoltTightener.setMaxTorque( )} before tightening.
06:   */
```

In this example comment block, the syntax '/**' and '*/' is used to indicate the start and end of the comment block and the embedded structured text is the character string "[inline DEFAULT_MAX_TORQUE_VALUE]" and the character string "{@link BoltTightener.setMaxTorque( )}". The programmer may expect a compiler or documentation generator to replace the embedded structured text with links or other rich or specially formatted content. In the current example, the programmer may expect the compiler or documentation generator to replace the embedded structured text "[inline DEFAULT_MAX_TORQUE_VALUE]" with the initial value of the declaration in the programming language of the common specification of the variable named "DEFAULT_MAX_TORQUE_VALUE." In addition, the programmer may expect the compiler or documentation generator to replace the embedded structured text "{@link BoltTightener.setMaxTorque( )}" with an inter-documentation hyperlink. The programmer might expect other functions of the compiler or documentation generator. For example, in a version of the documentation for metric users, the programmer might expect the torque value to be translated to Newton-meters. Generated documentation that does not meet programmer expectations will frustrate programmers and the associated software may be perceived as of low quality.

Another problem solved for many different programming language targets is meeting the different expectations of programming language communities for documentation. A non-exhaustive list of different documentation generators for different programming languages include: DDOC for D, DOKKA for KOTLIN, DOXYGEN for C++, JAVADOC for JAVA, JDOC for JAVASCRIPT, OCAMLDOC for OCAML, PERLDOC for PERL, PHPDOCUMENTOR for PHP, PYDOC for PYTHON, and SCALADOC for SCALA. Programmers in these different communities have invested time learning how to efficiently scan documentation produced by these documentation generators. Software programming language documentation that differs too much stylistically and organizationally from that produced by a programming language community's preferred documentation generator will be perceived as unnecessarily hard to digest and of lower quality.

Yet another problem solved for many different programming language targets is meeting the expectations of machines (e.g., computer programs executing on computer devices that accept software programming interface documentation as input). An Integrated Development Environment (IDE) executing on a computing device is one example of such a machine. For example, when a programmer using an IDE moves the point device cursor of a word in source code, the IDE might display fragments of generated documentation related to that word. As another example, when a programmer begins typing a word of source code, an IDE may suggest possible completions for a prefix of the word along with associated documentation fragments for each possible completion. For example, consider a programmer that types "isRe" into an IDE source code editor. In response, the IDE might present the following options as possible completions:

"isReadable—True, if it has been published and has become available for reading".

"isReady—True if it would pass pre-publication checks".

Related to the above problem, if an IDE cannot extract relevant documentation fragments using its algorithms that were likely developed and testing with outputs from commonly used documentation generators, then software libraries bundled with that documentation will be harder to learn and harder to use correctly.

Still yet another problem solved is supporting cross-references in documentation. Returning to the bolt tightener example above, recall that the comment block includes embedded structured data that references a program element. The program element is referenced in the comment block with the text "{@link BoltTightener.setMax Torque( )}". Such structured data may be converted into hyperlinks. When converting to a hyperlink, the reference needs to be translated to a machine-interpretable reference. An example of a machine-interpretable reference is a Uniform Resource Locator (URL) that links to another part of the generated documentation that explains the reference. In addition, when converting to a hyperlink, the embedded structured text needs to be replaced with "link text." The link text often differs for different programming language targets. For example, the way a C++ programmer may refer to the conceptual entity named "setMaxTorque" in a comment block may differ from the way a PYTHON programmer refers to that entity in a comment block.

Still yet another problem solved is that a public software programming language interface element in a specification in a target programming language may not correspond one-to-one to an element in the common specification in a common specification programming language. In particular, the common specification might define a conceptual grouping of elements that corresponds to no single element in a specification in a target programming language. For example, consider the following definition of the concept of cardinal direction in a common specification programming language:

```
01:  enum CardinalDirection {
02:      North,
03:      West,
04:      South,
05:      East,
06:  }
```

The above definition defines a conceptual grouping named "CardinalDirection", and gives names to four distinct entities within the conceptual grouping. Some target programming languages may not define the conceptual grouping in the same way. As such, there is not always a one-to-one translation of a documentation cross-reference to a conceptual grouping in the common specification to a documentation cross-reference to the conceptual grouping as defined in a target programming language.

For example, the conceptual grouping might be defined in the PERL programming language as follows:

```
01:    use constant {
02:            CARDINAL_DIRECTION_NORTH => 0,
03:            CARDINAL_DIRECTION_SOUTH => 1,
04:            CARDINAL_DIRECTION_SOUTH => 2,
05:            CARDINAL_DIRECTION_EAST => 3,
06:    };
```

Here, the conceptual grouping is defined in accordance with widely accepted PERL programming practice where the conceptual entity name is a prefix of the name of each entity within the conceptual grouping in the uppercase and underscore form shown. However, as a consequence, there is no programming language construct to which "CardinalDirection" could refer.

As another example, in the GO programming language, the conceptual grouping might be defined as follows:

```
01:    type CardinalDirection int
02:    const (
03:            North CardinalDirection = iota
04:            West
05:            South
06:            East
07:    )
```

Here, a cross-reference to CardinalDirection could translate to "type CardinalDirection". However, by convention, GO programmers often put that definition in its own source code file and refer to the file in documentation cross-references instead of the type definition itself.

And in the JAVA programming language, the conceptual grouping might be defined as follows:

```
01:    enum CardinalDirection {
02:            NORTH,
03:            WEST,
04:            SOUTH,
05:            EAST,
06:    }
```

Unlike with the PERL and GO examples above, in the JAVA example it is possible to translate possible translate a documentation cross-reference to "CardinalDirection" directly.

Still yet another problem is that usage examples authored by a programmer in source code comments in the common specification can refer to common concepts that are represented differently in different target languages. Such usage examples often follow the following narrative arc:
1. Connect to a library.
2. Create some inputs.
3. Use parts of the library with the inputs.
4. Explain the outputs.

Consider the following usage example that might be defined in the common specification:

```
01:    import documentedLibrary;
02:    let independenceDay = Date( year: 1776, month: 8, day: 2);
```

-continued

```
03:    let dayCount = documentedLibrary.daysSince(independenceDay);
04:    /* dayCount is a number. Approximately 89,000 */
```

Here, date is a common concept. Line 01 connects to a library. Line 02 creates an input. Line 03 uses a part of the connected library with the input. And Line 04 is a comment explaining the output. This usage example and others like it should be translated differently per target programming language into a usage example that a programmer familiar with the target language would recognize as expressing an instance of the date common concept. For example, the usage example in JAVA should probably replace the phrase "Date(year: 1776, month: 8, day: 2)" from the common specification with text based on the java.time package. And in target programming languages where it is traditional to represent a date as a string of characters that follows certain conventions, the date phrase might be replaced with the character string "17760802" as an example.

Still yet another problem is that documentation cross-references may span common specifications. For example, two different common specifications may be separately maintained by different teams of programmers. Nonetheless, one of the common specifications may contain a documentation cross-reference to the other common specification. This cross-reference should be maintained in the target programming language documentation for generated from the common specifications.

Techniques disclosed herein solve all of these problems thereby providing an improvement in the state of the art of computer-implemented techniques for producing idiomatic software documentation for many programming languages from a common specification.

Documentation Generation System

FIG. 1 is a schematic of a software documentation generation system for producing idiomatic software documentation for many programming languages from a common specification. Inputs 102 to the system include common specification 104. Common specification 104 may encompass at least two types of printable text content: (1) programming language statements and expressions (source code) programmed in a common specification programming language, and (2) source code comments (documentation fragments). The comments may include prose, embedded structured text, and source code usage examples.

Common specification 104 may be stored in computer storage media as one or more files or one or more other suitable data containers. The one or more data containers may encompass one or more data containers that contain source code which may also contain source code comments. However, it is also possible for a data container containing source code to contain a reference or link (e.g., a hyperlink) to another data container that contains the source code comments for the source code. As such, while source code and source code comments may be stored in the same data container, that may instead be stored in separate data containers where textual links or references are used to reference source code comment data containers from within source code data containers.

For example, consider the following possible snippet of common specification 104. Lines 01 through 08 encompass a documentation fragment. The character sequence "/**" at Line 01 indicates the start of the documentation fragment. The character sequence "*/" at Line 08 indicates the end of the documentation fragment. Line 02 is prose. Lines 03 through 07 represent a usage example enclosed within the XML-like markup tags <example></example>. And Line 09 represents non-documentation programming language instructions source code where ' . . . ' is used to represent further details that are not provided in the example for the purpose of providing a clear example.

```
01:     /**
02:     Call it thus to say "Hello, World!"
03:        <example>
04:           let message = "Hello, World!";
05:           say(message);
06:           // stdout: "Hello, World!"
07:        </example>
08:     */
09:     function say(. . .) {. . .}
```

While in the above-example XML-like tags are used to designate a portion of the comment block as encompassing a usage example, other syntax is used in other implementations. For example, instead of XML-like tags, a usage example might be enclosed within two backticks "''" on separate lines as just one possibility.

Common specification 104 may be input to both documentation fragment extractor 106 and compiler 118. Documentation fragment extractor 106 may extract documentation fragments from common specification 104 or one or more files referred to by common specification 104 and compiler 118 may extract source code from common specification 104. Such extraction may involve operations performed by a compiler front-end such as line reconstruction, preprocessing, lexical analysis (tokenization), syntax analysis (parsing), and semantic analysis. Generally, documentation fragments extracted from common specification 104 may correspond to source code comments in common specification 104 and source code extracted from common specification 104 may correspond to other text of common specification that is not a comment. The other text may encompass statements and expressions in of the common specification programming language.

While in some implementations some or all of a documentation fragment is included inline with source code in a source code file of common specification 104, some or all of a documentation fragment is obtained from a file that is referred to by a textual link (e.g., a hyperlink) that is inline with source code in a source code file of common specification 104. Thus, all of a documentation fragment may be extracted from a source code file of common specification 104 containing source code in the source programming language, all of a documentation fragment may be extracted from a separate file that is referred to by a textual link in a source code file of common specification 104, or some of a documentation fragment may be extracted from source code file of common specification 104 and some of the documentation fragment may be extracted from a separate file that is referred to by a textual link in the a source code file of common specification 104. Extracting a documentation fragment from common specification 104 may encompass any of these types of extractions.

Compiler 118 may also perform operations on an intermediate representation of the source code of common specification 104. The intermediate representation may be generated by compiler 118 as result of front-end operations performed on source code of common specification 104. In some implementations, the intermediate representation is based on the set of interlinguistic definitional elements as described in related U.S. patent application Ser. No. 17/131, 574, entitled "Deriving Many Idiomatic Programming Language Interfaces," filed Dec. 33, 2020, the entire contents of which is hereby incorporated by reference.

Compiler 118 may perform various operations on the intermediate representation. Some analysis operations that compiler 118 may perform on the intermediate representation may include data-flow analysis, dependency analysis, alias analysis, pointer analysis, escape analysis, or other suitable analysis operations that may be performed by a compiler middle-end. Some optimization operations that compiler 118 may perform on the intermediate representation may include inline expansions, dead code elimination, constant propagation, loop transformation, or other suitable optimization operations that may be performed by a compiler middle-end.

Output of compiler 118 may be input to code generator 120. Code generator 120 corresponds to a compiler back-end for a particular programming language target. The system may encompass many code generators for many different programming language targets. In the example of FIG. 1, only one code generator 120 is shown for simplicity. In some implementations, the system encompasses many code generators for many different programming language targets. For example, system may encompass a distinct code generator for each of the following programming language targets: C, JAVA, PYTHON, C++, C#, JAVASCRIPT, PHP, SWIFT, R, LISP, FORTRAN, ADA, PASCAL, GROOVY, RUBY, GO, OBJECTIVE-C, DART, SCALA, and LUA.

Documentation Fragment Language

Source code usage examples of documentation fragments extracted from common specification 104 by documentation fragment extractor 106 may conform to a documentation fragment programming language. The documentation fragment language may be a common specification programming language, a subset of the common specification programming language, or a programming language specialized for authorizing source code usage examples in documentation.

The documentation fragment language may provide various capabilities for authoring source code usage examples as part of sour code comments in common specification 104. The documentation fragment language can allow for specifying a sequence of steps. For example, in the following example there are three steps in a sequence with the first step at Line 01, then next step at Line 02, and the last step at Line 03:

```
01:   import documentedLibrary;
02:   let independenceDay = Date( year: 1776, month: 8, day: 2);
03:   let dayCount = documentedLibrary.daysSince(independenceDay);
```

The documentation fragment language can allow for declaration of a variable name. For example, in Line 02 above the keyword "let" is used to declare variable name "independenceDay."

The documentation fragment language can allow for crafting a value via common concept corpus 112. For example, in Line 02 above, the value Date(year: 1776, month: 8, day: 2) representing the date of Aug. 2, 1776 is crafted via common concept corpus 112.

The documentation fragment language can allow a value to be associated with a variable name. For example, in Line 02 above, the equals character ('=') is used to associate the value created via common concept corpus 112 and the variable name "independenceDay."

The documentation fragment language can allow for use of part of a documented library's application programming interface with names or values to obtain a value as a result. For example, in Line 03 above, the interface of the library named "documentedLibrary" is used with the variable name "independenceDay" to obtain a value as a result which is associated with the variable name "dayCount."

The documentation fragment language may support a cross-reference syntax sufficient to distinguish which interface element to use. For example, in Line 03 above, a period ('.') is used to distinguish the library name "documentedLibrary" from the interface element "daysSince."

The documentation fragment language may support a procedure call syntax that allows for grouping of values to send (pass) in the procedure call. For example, in Line 03 above, open and close parentheses following the interface element name "daysSince" are used to specify the value to pass in the procedure call.

The documentation fragment language may support explanation in prose of what certain steps do. For example, the documentation fragment language may support interstitial programming language comments such as, for example, "/* some prose */."

The documentation fragment language may support that use of structured programming language statements such as if-then-else and for and while loop statements to allow the programmer to show in a source code usage example how to combine different strategies.

The documentation fragment language may support the identification of any result or results worthy of further discussion. As examples: The documentation fragment language may provide syntax that allows the programmer to show that a result is equivalent to a value (e.g., "result==42"). The documentation fragment language may allow use of an idiom along with prose to show what the reader would see if they ran the program represented by the source code usage example (e.g., "print(result)/* would print 42 */".) The documentation fragment language may allow use of metadata to specify what the reader would see if they ran the program where the metadata is formatted to make clear to the reader that the text associated with the metadata specifies what the reader would see if they ran the program. For example, the text '//stdout: "Hello, World!"' might be used to specify that the text "Hello, Word!" would be output to the standard output device of the program and where the text "//stdout:" is the metadata for specifying so.

The documentation fragment language may allow for expression of a nested procedure that appears inside another procedure.

Distinction Between Statements and Expressions

Many programming language targets distinguish between statements and expressions. A statement is a unit of source code that specifies some action to be carried out. Examples of statements included assertion statements, assignment statements, goto statements, return statements, call statements, block statements, do-loop statements, for-loop statements, if-then-else statements, switch statements, while-loop statements, with-statements, etc. An expression is a unit of source code that is evaluated to determine its value. In many cases, a statement can contain an expression, but an expression does not contain a statement. An exception to this is a nested procedure. In sum, expressions create values and possibly have side-effects while the sole purpose of statements is to have side-effects.

Some programming languages do not distinguish between statements and expressions. For example, some functional programming languages do not make this distinction. It is possible to translate source code in a programming language which does not distinguish between statements and expressions to source code in another programming language that does. Doing so typically involves introducing temporary (throwaway) variables. Such variables serve to temporarily hold values but often use variable names that are not meaningful to humans. Consequently, introducing temporary variables to translate a source code usage example into a source code usage example in a target programming language that is meant to be read will lead to low quality documentation. Thus, the documentation fragment language may make a distinction between expressions and statements including having rules about where each kind can be used in a source code usage example in common specification 104. This way a source code usage example in common specification 104 can be translated to a source code usage example in a target programming language that also supports this distinction without using temporary variables that have meaningless names.

Nested Procedures

Some target programming languages do not permit nested procedures. A nested procedure is a procedure defined within another procedure. To support translation to both target programming languages that do permit nested procedures and target programming languages that do not allow nested procedures, the documentation fragment language may require that nested procedures be given a descriptive name even when the name is not mentioned in the source code usage example in common specification 104. By doing so, for a target programming language that does not support nested procedures, the nested procedure can be converted into an un-nested procedure in the target language that can be called by the given descriptive name. For example, the descriptive name can be explicitly mentioned in the source code usage example in common specification 104 such as by using metadata. Alternatively, a user can be prompted for user input to provide a descriptive name upon detecting an unnamed nested procedure in common specification 104.

Common Concept Corpus

Common concept corpus 112 may be provided in the system for translating external concepts from phrases in documentation fragments extracted from common specification 104 to equivalent phrase for a given target programming language. For example, for JAVASCRIPT, common concept corpus 112 may translate "Date(year: 1776, month: 8, day: 2)" from the example above to "new Date(1776, 7, 2)" for JAVASCRIPT.

Common concept corpus 112 may be implemented as a translator for abstract tokens. A machine learning-based or a grammar driven translator may be used, for example. For example, common concept corpus 112 may produce the following sequence of abstract tokens from "Date(year: 1776, month: 8, day: 2)":

```
01:         <concept><common:Date></concept>
02:         <year>1776</year>
03:         <month>8</month>
04:         <day>2</day>
```

The above-example sequence of abstract tokens is formatted eXtensible Markup Language (XML)-like. However, no particular abstract token sequence format is required, and the XML-like format is used merely as an example of one possible format. Other structured text formats or binary formats are possible.

Common concept corpus 112 may use a grammar driven translator to translate an abstract token sequence form of a common concept in a documentation fragment extracted from common specification 104 to a token sequence for a target language. For example, common concept corpus 112 may encompass a translation grammar for each target programming language and for each concept. For example, the translation grammar for JAVASCRIPT and the date concept might be as follows, expressed in an Augmented Backus-Naur Form (ABNF):

```
01: Start := concepts;
02: concepts := Date;
03: Date := <concept><common:Date></concept>
04:    "new" "Date" "(" <year>int </year>"," <month>int </month>","
05:    <day>int </day>"," <hour>int </hour>"," <minute>int </minute>","
06:    <second>int </second>"," <minis>int </minis>")";
07: int :=/^\d+/;
```

As another example, the translation grammar for JAVA and the date concept might be as follows, again expressed in ABNF:

```
01:     Start := concepts;
02:     concepts := Date;
03:     Date := <concept><common:Date></concept>
04:        <postprocess:hoist to="java:imports">
05:        "import" "java.time.LocalDate" ";"
06:        </postprocess:hoist>
07:        <postprocess:hoist to="java:imports">
08:        "import" "java.time.Month" ";"
09:        </postprocess:hoist>
10:        "LocalDate" "." "of" "("
11:        <year> int </year> ","
12:        <month> month </month> ","
13:        <day> int </day>
14:        ")";
15:     int :=/^\d+/;
16:     month := "Month" "." (
17:        s/^1$/JANUARY/ |
18:        s/^2$/FEBRUARY/ |
19:        s/^3$/MARCH/ |
20:        s/^4$/APRIL/ |
21:        s/^5$/MAY/ |
22:        s/^6$/JUNE/ |
23:        s/^7$/JULY/ |
24:        s/^8$/AUGUST/ |
25:        s/^9$/SEPTEMBER/ |
26:        s/^10$/OCTOBER/ |
27:        s/^11$/NOVEMBER/ |
28:        s/^12$/DECEMBER/
29:        );
```

In the above example grammar, quoted tokens are included in the output unchanged. Tokens between angle brackets "< . . . >" are required on input unless marked with "postprocess:" as for processing during a post-processing pass. Grammar content between "/ . . . /" uses regular expression syntax to match input tokens that are not between angle brackets.

To walkthrough an example, consider the following example source code usage example that might be in a documentation fragment extracted from common specification 104:

```
1:    import documentedLibrary;
2:    let independenceDay = Date( year: 1776, month: 8, day: 2);
3:    let dayCount = documentedLibrary.daysSince(independenceDay);
```

The common concept text "Date(year: 1776, month: 8, day: 2)" may then be converted to the following abstract token sequence:

```
01:      <concept><common:Date></concept>
02:      <year>1776</year>
03:      <month>8</month>
04:      <day>2</day>
```

Then, if the example JAVASCRIPT grammar for the date concept is applied to above abstract token sequence, the following abstract token sequence for the JAVASCRIPT language is generated:

```
01:      <concept><common:Date></concept>
02:      "new"
03:      "Date"
04:      "("
05:      <year> "1776" </year>
06:      ","
07:      <month> 8 </month>
08:      ","
09:      <day> 2 </day>
10:      ")"
```

Finally, the following JAVASCRIPT source code is generated from the above abstract token sequence, after removing the angle bracket tokens, and inserting whitespace in accordance with JAVASCRIPT conventions:

```
01:              new Date(1776, 8, 2)
```

Post-Processing

Sometimes a part of a translation requires adding a fragment to another part of a program. For example, before using the term "DateTime" to refer to a type in JAVA's core java.time package, the JAVA programming language requires an import directive like "import java.time.LocalDate;" near the top of the source file. To support such use, a translation grammar for a target language may include hoisting directives. A hoisting directive signals a post-processing pass to move an associated statement to an appropriate location in a source file. For example, the JAVA grammar above for the date concept would produce the following abstract token sequence from the initial abstract token sequence representing the common concept text "Date (year: 1776, month: 8, day: 2)":

```
01:      <postprocess:hoist to="java:imports">
02:      import java.time.LocalDateTime;
03:      </postprocess:hoist>
04:      <postprocess:hoist to="java:imports">
05:      import java.time.Month;
```

```
06:         </postprocess:hoist>
07:         LocalDate.of(1776, Month.AUGUST,2)
```

In the above example, Lines 01 through 06 contain hoisting directives for a post-processing pass to move (hoist) the associated import statements at Lines 02 and 05 to appropriate location in a source code file for containing JAVA import statement (e.g., near the top of the source code file).

Envelopes

Some source code usage examples elide unnecessary detail. For example, the author of the source code usage example may assume that the reader will know how to add the common boilerplate above and below the provided usage example to turn it into a complete program. This boilerplate is referred to herein as the "envelope" of the source code usage example. The envelope of a source code usage example in common specification 104 that is translated to a source code usage example in a target programming language is the content before and after the displayed part of the source code usage example that is necessary for the source code to run but which, if visible to the reader, would distract from the point the author is trying to make.

In some implementations, generated documentation includes the envelope but styled in a way that it is invisible. In addition, the envelope is included when a "copy to clipboard" operation or an "open in source code editor" operation is applied to the visible portion of the source code usage example.

A translation of a source code usage example in common specification 104 to a target programming language may include abstract tokens to distinguish envelope content from pertinent content. The abstract tokens may mark the beginning and end of envelope content. For example, a JAVA translation of only the common date concept discussed above, but with envelope content might be, after post-processing the hoisting directives discussed above:

```
01:     //BEGIN ENVELOPE
02:     package com.example;
03:     import java.time.LocalDate;
04:     import java.time.Month;
05:     public class C {
06:         public static void main(String[ ] argv) {
07:             // END ENVELOPE
08:             LocalDate.of(1776, Month.AUGUST, 2)
09:             // BEGIN ENVELOPE
10:             ;
11:         }
12:     }
13:     //END ENVELOPE
```

In the above example, the text "//BEGIN ENVELOPE" and the text "//END ENVELOPE" are abstract tokens used to make the beginning and end of envelope content.

Envelopes are useful for other reasons. For example, when a source code usage example translation results in a stand-alone program in a target language, the program can be compiled and executed to determine if it produces an error. This provides an easy way to detect errors in the translation and mistaken assumptions by the author.

Further, structured text in or adjacent to a source code usage example may indicate the expected output of the example. A translation of the source code usage example with an envelope to a target language can be compiled and executed to test whether the output of the program matches the expected output. Note that it is possible for the expected output to be an error or thrown exception such as when a source code usage example is provided to illustrate how not to program something. In this case, the program may be executed to test whether it generates the expected error code or throws the expected exception.

The envelope may be specified separately such as per target programming language. Alternatively, the envelope may be automatically generated and output by documentation fragment translator 114.

Envelope and Testing Example

Returning to a previous example, consider the following possible content of common specification 104:

```
01:     /**
02:         Call it thus to say "Hello, World!"
03:         <example>
04:             let message ="Hello, World!";
05:             say(message);
06:             // stdout: "Hello, World!"
07:         </example>
08:     */
09:     function say(...) {...}
```

Documentation fragment extractor 106 may identify Lines 01 through 08 as a source code comment block by the beginning "/**" and ending "*/" comment block markers. Based on this identification, documentation fragment extractor 106 may extract Lines 02 through 07 as a documentation fragment. Meanwhile, compiler 118 may identify Line 09 as source code that is not enclosed as part of a common block and that is to be compiled. Documentation fragment extractor 106 may pass the extracted documentation fragment onto documentation fragment translator 114.

The documentation fragment in this example contains a source code usage example at Lines 04 and 05 of common specification 104 example above. When a documentation fragment contains a source code usage example, documentation fragment translator 114 may be configured to translate source code usage example to an enveloped source code usage example in a particular target programming language. The enveloped source code usage example may then be output to test source code file 124. For example, for the current example, if the target language is JAVA, then test source code file 124 might contain the following JAVA source code:

```
01:     package samplecode;
02:     import static com.example.Library. say;
03:     public class C {
04:         public static void main(String[ ] argv) {
05:             String message ="Hello, World!";
06:             say(message);
07:         }
08:     }
```

In this example, Lines 05 and 06 of the JAVA source code are derived directly from Lines 04 and 05 of common specification 104 example above. The remaining lines of the JAVA source code are part of the envelope automatically generated by documentation fragment translator 114.

The documentation fragment in this example contains an expected output indicator "//stdout:" at Line 06 of common specification 104 example. When a documentation fragment contains an expected output indicator, documentation fragment translator 114 may be configured to output the expected output to expected output file 122, which may be a file system file or a standard output "file." For example, for the current example, expected output file 122 might contain the following content:
01: Hello, World!

Compiler 118 may pass an intermediate representation (e.g., an abstract token sequence) of the source code in common specification 104 onto code generator 120. In addition, documentation fragment translator 114 may pass an intermediate representation (e.g., an abstract token sequence) of the documentation fragment onto code generator 120. Code generator 102 may be for the particular target language (e.g., JAVA). From the input intermediate representations, code generator 102 produces library source code file 126 in the target language. Library source code file 126 contains both a translation of the source code in common specification 104 to the target language and a translation of the documentation fragment to the target language. For example, for the current example, if the target language is JAVA, then library source code file 126 might contain the following content:

```
01:      package com.example;
02:
03:      class Library {
04:          /**
05:          Call it thus to say "Hello, World!"
06:
07:          <span class=envelope>
08:          package samplecode;
09:          import static com.example.Library say;
10:          public class C {
11:              public static void main(String[ ] argv) {
12:          </span>
13:                  String message ="Hello, World";
14:                  say(message);
15:          <span class=envelope>
16:              }
17:          }
18:          </span>
19:          */
20:          public void say(...) {...}
21:      }
```

In the above example, Lines 01 through 03 and Lines 20 through 21 represent a JAVA translation of the source code of common specification 104 example and Lines 04 and 19 represent a JAVA translation of the documentation fragment example. It should be noted that the JAVA documentation fragment contains a translation of the source code usage example of the documentation fragment extracted from common specification 104 example. The JAVA translation of the source code usage example includes an envelope which is delineated by XML-like markup. If the <span> tag is processed as Hyper Text Markup Language (HTML) or the like, then a definition of the "envelope" class in a Cascading Style Sheet (CSS) or the like can be used to hide the contents of the envelope in a default presentation of library source code file 126 in a graphical user interface such as by a source code editor, a web browser, or other computer application. For example, by default, the contents of library source code file 126 may be displayed with the envelope contents invisible as follows:

```
01:      package com.example;
02:
```

```
03:      class Library {
04:          /**
05:          Call it thus to say "Hello, World!"
06:
07:                  String message = "Hello,World";
08:                  say(message);
09:
10:          */
11:          public void say(...) {...}
12:      }
```

Target language compiler 130 may compile library source code file 126 into target library 138. For example, if the target is JAVA, then target language compiler 130 may be a conventional or third-party JAVA source code compiler.

Target language documentation generator 134 may generate target documentation 140 from library source code file 126. For example, if the target is JAVA, then target language documentation generator 134 may generate the JAVADOC for the computer program or the like.

Test runner 128 may use target language compiler 130 to compile test source code file 124 into a runnable computer program. Test runner 128 may then run the computer program and capture the output for comparison to expected output 122. When run, the test computer program may load and invoke target library 138 generated from library source code 126. If the output of the test computer program captured by test runner 128 does not match the expected output 122, then test runner 128 may indicate test failure test results data 136. Such a test result may indicate that the source code usage example authored in common specification 104 contains a bug or other programming error or may indicate a problem in documentation fragment translator 114 in translating the source code usage example to the target language. On the other hand, if the output of the test computer program captured by test runner 128 does match the expected output 122, then test runner 128 may indicate test success in test results data 136.

Outputs 134 of the system including test results 136, target language library 138, and target language documentation 140 may be stored in one or more computer storage media.

The system may include other documentation fragment translators 114, other code generators 120, other target language compilers 130, and other target language documentation generators 132 for other target languages. In this way, the system can produce idiomatic software documentation for many programming language targets from common specification 104. Shared components 108 includes external cross-index fetcher 110 and common concept corpus 112 may be shared within the system across many different programming language targets.

Documentation Fragment Translator

Documentation fragment translator 114 may be configured to translate documentation fragments extracted from common specification 104 to a format that is meaningful to programmers familiar with a particular target programming language. An output of documentation fragment translator 114 can be embedded in source code 126 for the target programming language. The source code can then be input to target language documentation generator 132 to generate documentation 140 of source code 126. Alternatively, documentation fragment translator 114 may bypass target language documentation fragment translator 114 and output documentation 140 directly in a particular format like HTML, or PDF or the like that does not require target programming language-specific tools to generate.

A documentation fragment extracted from common specification 104 may include interrupted prose, source code usage examples in the documentation fragment language, or cross-references. Documentation fragment translator 114 may receive additional inputs in addition to the documentation fragment to translate. In particular, documentation fragment translator 114 may receive cross-index 116 relating references defined in common specification 104 for which documentation 140 is being generated to references apparent in target library 138 derived from common specification 104. Cross-index 116 may also include cross-indices for libraries derived from other common specifications where such cross-indices may define inputs, outputs, or operators used by common specification 104 for which documentation 140 is being generated by documentation fragment translator 114.

Other inputs to documentation fragment translator 114 may include metadata allowing documentation fragment translator 114 to use external cross-index fetcher 110 to fetch cross-indices it need; metadata describing where documentation 140 will be made available or published such as, for example, a network location specified by a URL; metadata describes the locale(s) or human language(s) of prose in input documentation fragments; metadata describing the locale(s) or human language(s) which readers of documentation 140 prefer; metadata describing whether a source code usage example of a documentation fragment is a valid example or is meant to explain what not to do; metadata describing the computational result of a source code usage example of a documentation fragment; or metadata describing what a person running a test computer program based on a translated source code usage example and a suitable envelope should see.

Documentation fragment translator 114 may be configured to translate prose in a documentation fragment extracted from common specification 104 from one human language to another such that the output library source code file 126 includes the pose in the target human language.

Documentation fragment translator 114 may translate a source code usage example in the documentation fragment language into an equivalent source code usage example in a target language. In doing so, documentation fragment translator 114 may generate and introduce an envelope in the target programming language for the equivalent source code usage example in the target language.

Documentation fragment translator 114 may produce additional outputs to enable checking any expected result or expected output of a source code usage example against an actual result or an actual output of a test computer program that is compiled from an enveloped version of the source code usage example in a target language and then run to generate the actual result or actual output. In addition, or alternatively, documentation fragment translator 114 may perform quality control checks internally and emit their results as additional outputs.

Phases of Translation

Figure 2:
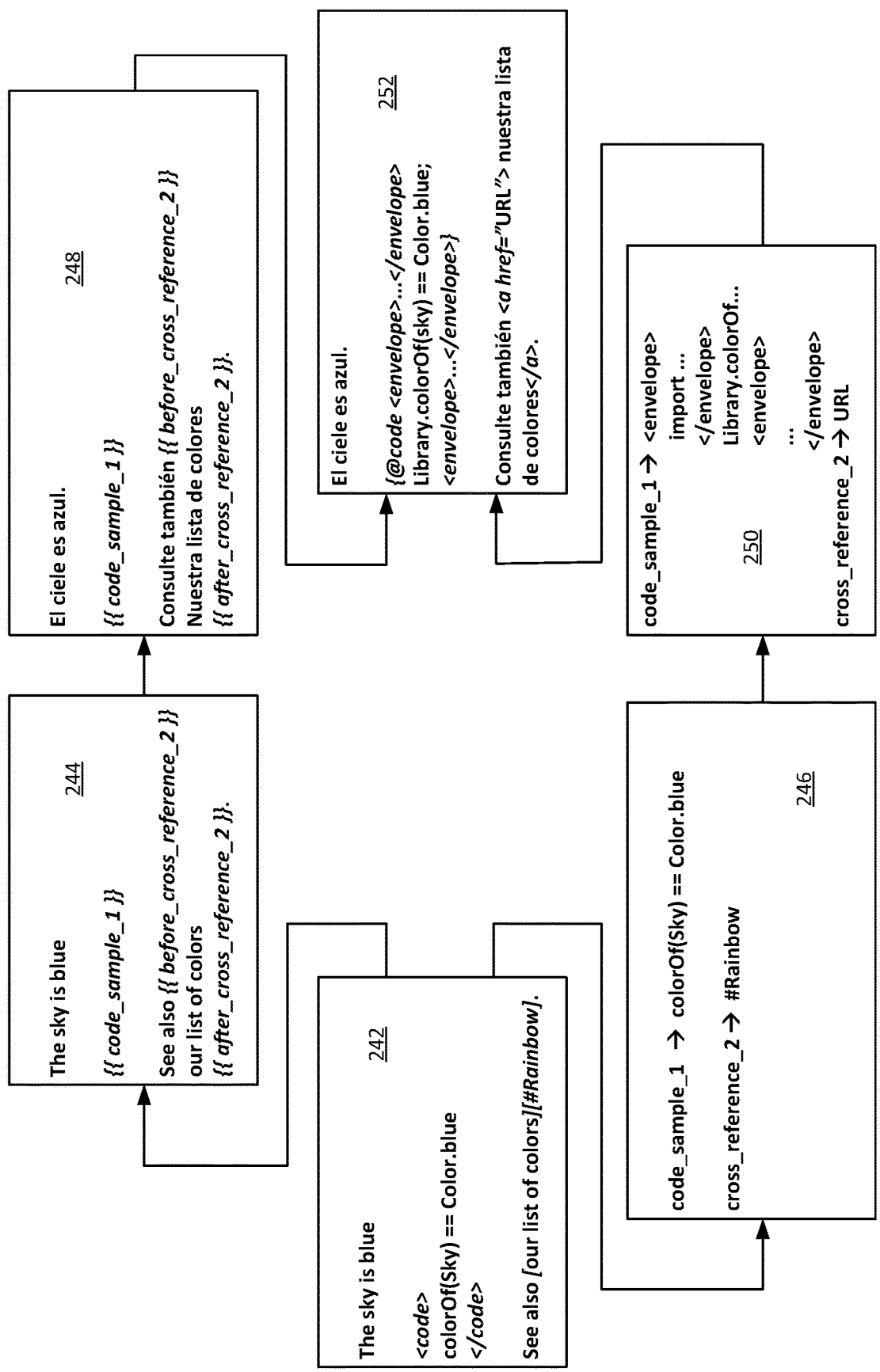
FIG. 2 is a flow diagram of phases of translation in a documentation fragment translator of the software documentation generation system.

Referring now to FIG. 2, documentation fragment translator 114 may use a parser applied to a documentation fragment extracted from common specification 104. The parser may be used to separate out structured text within the interrupted text. Element 242 depicts an example documentation fragment extracted from common specification containing interrupted prose with embedded structured text. In element 242, the embedded structured text is italicized.

Documentation fragment translator 114 may then separate the interrupted prose but with structured text placeholders which indicate where to reincorporate structured text (e.g., as in element 244) from structured text portions isolated from the interrupted prose (e.g., as in element 246). Element 244 shows the interrupted prose of element 242 but with structured text placeholders indicating where to reincorporate structure text. Element 246 relates placeholders to separated structured text.

As an alternative to documentation fragment translator 114 using a parser to separate interrupted prose from its embedded structured text, documentation fragment translator 114 may receive these components from documentation fragment extractor 106 pre-separated. For example, instead of documentation fragment extractor 106 inputting a documentation fragment in a combined form like element 242 to documentation fragment translator 114, documentation fragment extractor 106 can input a pre-separate form of the documentation fragment like elements 244 and 246.

Documentation fragment translator 114 can translate the interrupted prose with the embedded placeholders to translated, interrupted prose with the embedded placeholders. In doing so, the placeholder text need not be translated. For example, element 248 represents a Spanish language translation of the English interrupted prose of element 244. Note that the translated, interrupted prose of element 248 still contains the placeholders in the same semantic locations.

Translating cross-indexing phrases such as the "cross_reference_2" of element 246 may involve documentation fragment translator 114 looking up the whole or parts of the phrase in a cross-index table. It may be convenient to build these tables during compilation of common specification 104 since compiler 118 may have already found and processed named entities within a larger program and used rules for identifying them when an abbreviated name is the same as a longer, standalone name in context. Compiler 118 may also frequently deal with names that refer to programming language structures defined in source files authored by third parties, so it is often convenient for compiler 118 to produce cross-indices that allow relating cross-index phrases to programming language elements referenced by but defined outside common specification 104.

Element 246 contains a reference "code_sample_1" to the source code usage example of the documentation fragment represented by element 242. In element 250, the source code usage example has been translated to an enveloped source code usage example in a target language. Also, in element 250, the "cross_reference_2" value #Rainbow has been translated to a specific corresponding URL. Documentation fragment translator 114 than recombines the translated, interrupted prose with embedded placeholders represented by element 248 and the related placeholders translated to structured text represented by element 250 to clear, semi-structured text with formatting hints meaningful to end-user tools as represented by element 252. Such end-user tools may include target language compiler 130, target language documentation generator 132, and tools (e.g., web browsers, IDEs, or source code editors) for viewing generated documentation 140.

In element 242, italicized text represents embedded structured text. In element 244, italicized text represents embedded placeholder text. In element 248246, italicized text represents embedded placeholder text. In element 252, italicized text represents semi-structured text with formatting hints meaningful to end-user tools.

Process for Documentation Generation

Figure 3:
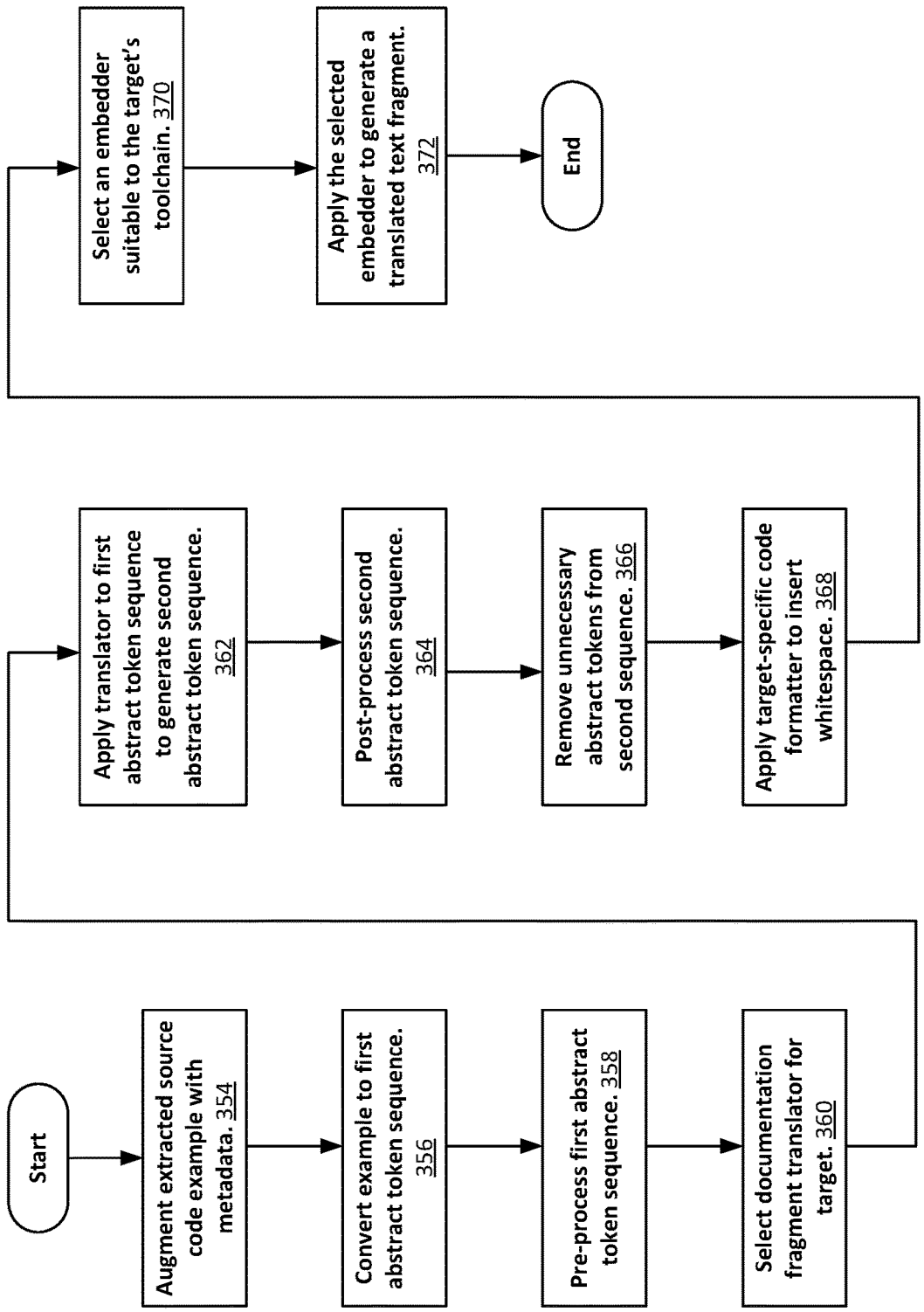
FIG. 3 is a flow diagram of a process for producing idiomatic software documentation for many programming languages from a common specification.

FIG. 3 is a flowchart of a process for producing idiomatic software documentation for many programming language targets from a common specification. Operations 354 and 356 may be performed once for many programming language targets. Operations 358 through 372 may be performed for each programming language target.

At operation 354, the text of a source code usage example of a documentation fragment extracted from the common specification may be augmented with metadata. The text may be augmented based on one or more passes by a compiler for the documentation fragment language on the text to add implicit constructs that could be mentioned in the text but are typically elided for brevity. For example, the text "let n=123;" of the source code usage example could be augmented with data type information such as, for example, as "let n:number=123;" where the text ":number" augments the variable "n" to indicate that it represents a number data type as opposed to a string, a user-defined data type, or other data type. Other compiler-based augments are possible and no particular set of augmentations is required.

At operation 356, the augment text is converted into a first sequence of abstract tokens that represents the augmented text in an intermediate form independent of any particular target programming language. The conversion may be made according to a machine learning process or a grammar driven process. A grammar driven approach for converting the augment text into a sequence of interlinguistic definitional elements that may be used as the first sequence of abstract tokens is described in related U.S. patent application Ser. No. 17/131,574, entitled "Deriving Many Idiomatic Programming Language Interfaces," filed Dec. 22, 2020, the entire contents of which is hereby incorporated by reference.

At operation 358, the first sequence of abstract tokens is pre-processed for a given target language. For example, if the target language does not support nested functions and the source code usage example involves a nested function, then a closure-conversion may be performed.

At operation 360, a documentation fragment translator for the given target language is selected from a corpus of documentation fragment translators.

At operation 362, the selected documentation fragment translator is applied to the first abstract token sequence to generate a second abstract token sequence that is closer in structure to the given target language. The translation may be machine learning-based or grammar driven.

At operation 364, post-processing is performed on the second abstract token sequence. For example, when a series of tokens in the second sequence is surrounded by markers indicating it is a cross-reference, then a cross-reference transformation may be performed and the transformation applied to the second sequence to replace the series of tokens in the second sequence. As another example, when a series of tokens in the second sequence is surrounded by markers indicating the series of tokens needs to be hoisted, then move the series of tokens to its specified destination in the second sequence which may be in the envelope.

At operation 366, unnecessary tokens in the second sequence are removed. Such unnecessary tokens may include tokens that do not contribute text or identify boundaries that need to persist in the translation such as, for example, envelope boundaries.

At operation 368, a target-specific source code formatter is applied to the then second sequence of abstract tokens to insert whitespace where a reader would expect a human to place it. For most targets, it may be sufficient to:

1. Find non-textual output tokens such as envelope boundary markers and note their ordinal position,
2. Join the textual tokens with a single space between each,
3. Use a code formatter such as, for example, a pretty printer, suitable for the given target language to format the joined text,
4. Split the formatted text into tokens including whitespace tokens using a lexical analyzer suitable for the given target language, and
5. Reinsert the non-textual tokens at the ordinal positions taking care not to count inserted space tokens.

At operation 370, an embedder suitable to the given target language's toolchain is selected. For example, JAVADOC may be selected for JAVA and DOKKA for KOTLIN where both embedders allow embedding HTML in source code comments. An HTML embedder turns the textual tokens into HTML phrases that display that textual content, and replace envelope boundaries with metadata tags that both hide envelope content from the reader but make the envelope content available to scripts and operations that can use the envelope content. Such operations may include a copy to clipboard operation or an open in editor operation.

At operation 372, the embedder is applied to the token stream to produce a translated text fragment that will, possibly after further processing by a target-specific documentation generator, be clearly structured text meaningful to a person familiar with the target.

Basic Computing Device

The techniques may be implemented by at least one computing device. If by more than one computing device, the techniques may be implemented in whole or in part using a combination of computing devices that are coupled together using a network, such as a packet data network. A computing device used in an implementation of the techniques may be hard-wired to perform some or all of the techniques, or may include digital electronic devices such as at least one application-specific integrated circuit (ASIC) or field programmable gate array (FPGA) that is persistently programmed to perform some or all of the techniques, or may include at least one general purpose hardware processor programmed to perform some or all of the techniques pursuant to program instructions in firmware, memory, other storage, or a combination. A computing device used in an implementation of the techniques may also combine custom hard-wired logic, ASICs, or FPGAs with custom programming to accomplish some or all of the techniques. A computing device used in an implementation of the techniques may be a server computing device, a workstation computing device, a personal computing device, a portable computing device, a handheld computing device, a mobile computing device or any other computing device that incorporates hard-wired or program logic to implement some or all of the techniques.

Figure 4:
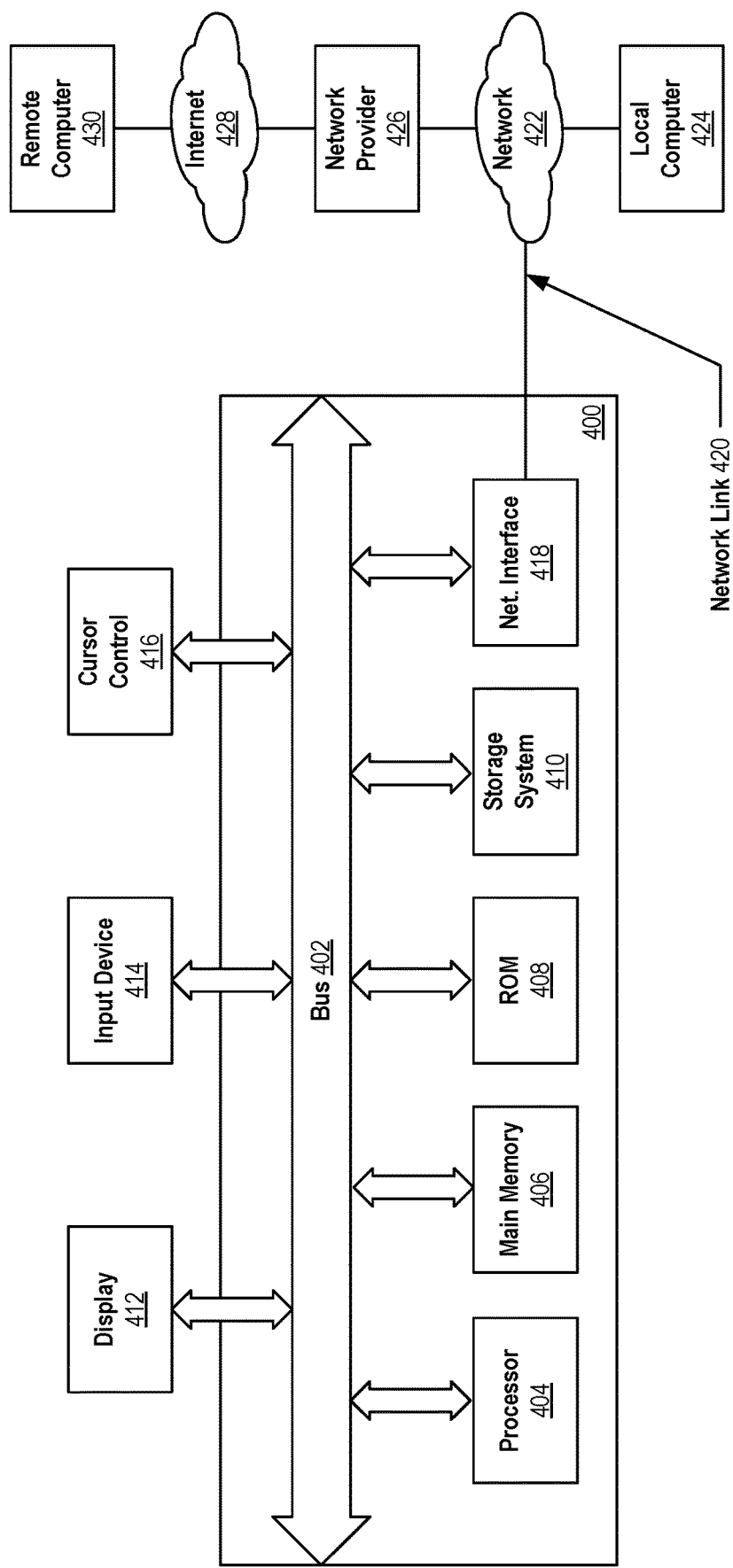
FIG. 4 is a block diagram of an example basic computing device that may be used in an implementation of the techniques.

FIG. 4 is a block diagram of an example basic computing device that may be used in an implementation of the techniques. In the example of FIG. 4, computing device 400 and instructions for implementing some or all of the techniques in hardware, software, or a combination of hardware and software, are represented schematically, for example as boxes and circles, at the same level of detail that is commonly used by persons of ordinary skill in the art to which this disclosure pertains for communicating about computer architecture and computing device implementations.

Computing device 400 includes an input/output (I/O) subsystem 402 which may include a bus or other communication mechanism for communicating information or instructions between the components of the computing device 400 over electronic signal paths. The I/O subsystem 402 may include an I/O controller, a memory controller and at least one I/O port. The electronic signal paths are represented schematically in the drawings, for example as lines, unidirectional arrows or bidirectional arrows.

At least one hardware processor 404 is coupled to I/O subsystem 402 for processing information and instructions. Hardware processor 404 may include, for example, a general-purpose microprocessor or microcontroller or a special-purpose microprocessor such as an embedded system or a graphics processing unit (GPU) or a digital signal processor or ARM processor. Processor 404 may comprise an integrated arithmetic logic unit (ALU) or may be coupled to a separate ALU.

Computing device 400 includes one or more units of memory 406, such as a main memory, which is coupled to I/O subsystem 402 for electronically digitally storing data and instructions to be executed by processor 404. Memory 406 may include volatile memory such as various forms of random-access memory (RAM) or other dynamic storage device. Memory 406 also may be used for storing temporary variables or other intermediate information during execution of instructions to be executed by processor 404. Such instructions, when stored in non-transitory storage media accessible to processor 404, can render computing device 400 into a special-purpose machine that is customized to perform the operations specified in the instructions.

Computing device 400 further includes non-volatile memory such as read only memory (ROM) 408 or other static storage device coupled to I/O subsystem 402 for storing information and instructions for processor 404. The ROM 408 may include various forms of programmable ROM (PROM) such as erasable PROM (EPROM) or electrically erasable PROM (EEPROM). A unit of persistent storage 410 may include various forms of non-volatile RAM (NVRAM), such as FLASH memory, or solid-state storage, magnetic disk or optical disk such as CD-ROM or DVD-ROM, and may be coupled to I/O subsystem 402 for storing information and instructions. Storage 410 is an example of a non-transitory computer-readable medium that may be used to store instructions and data which when executed by the processor 404 cause performing computer-implemented methods to execute some or all of the techniques.

The instructions in memory 406, ROM 408 or storage 410 may comprise one or more sets of instructions that are organized as modules, methods, objects, functions, routines or calls. The instructions may be organized as one or more computer programs, operating system services or application programs including mobile apps. The instructions may comprise an operating system or system software; one or more libraries to support multimedia, programming or other functions; data protocol instructions or stacks to implement TCP/IP, HTTP or other communication protocols; file processing instructions to interpret and render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or NoSQL, an object store, a graph database, a flat file system or other data storage.

Computing device 400 may be coupled via I/O subsystem 402 to at least one output device 412. Output device 412 may be a digital computer display. Examples of a display that may be used include a touch screen display or a light-emitting diode (LED) display or a liquid crystal display (LCD) or an e-paper display. Computing device 400 may include other types of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators or servos.

An input device 414 may be coupled to I/O subsystem 402 for communicating signals, data, command selections or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, or various types of sensors such as force sensors, motion sensors, heat sensors, accelerometers, gyroscopes, and inertial measurement unit (IMU) sensors or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on display 412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 414 may include a combination of multiple different input devices, such as a video camera and a depth sensor.

Computing device 400 may comprise an internet of things (IoT) device or other computing appliance in which one or more of the output device 412, input device 414, and control device 416 are omitted. The input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computing device 400 is a mobile or portable computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computing device 400. Output device 412 may include hardware, software, firmware and interfaces for generating position reporting packets, notifications, pulse or heartbeat signals, or other recurring data transmissions that specify a position of the computing device 400, alone or in combination with other application-specific data, directed toward host 424 or server 430.

Computing device 400 may implement some or all of the techniques using customized hard-wired logic, at least one ASIC or FPGA, firmware or program instructions or logic which when loaded and used or executed in combination with computing device 400 causes or programs computing device 400 to operate as a special-purpose machine.

The techniques performed by computing device 400 may be performed in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform some or all of the techniques. Hard-wired circuitry may be used in place of or in combination with software instructions.

The term "storage media" as used herein refers to any non-transitory computer-readable media that store data or instructions that cause a machine to operation in a specific fashion. Such storage media may comprise non-volatile media or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infra-red data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computing device 400 can receive the data on the communication link and convert the data to be read by computing device 400. For instance, a receiver such as a radio frequency antenna or an infrared detector can receive the data carried in a wireless or optical signal and appropriate circuitry can provide the data to I/O subsystem 402 such as place the data on a bus. I/O subsystem 402 carries the data to memory 406, from which processor 404 retrieves and executes the instructions. The instructions received by memory 406 may optionally be stored on storage 410 either before or after execution by processor 404.

Computing device 400 also includes a communication interface 418 coupled to bus 402. Communication interface 418 provides a two-way data communication coupling to network link 420 that is directly or indirectly connected to at least one communication networks, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 422 broadly represents a local area network (LAN), wide-area network (WAN), campus network, internetwork or any combination thereof. Communication interface 418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 618 sends and receives electrical, electromagnetic or optical signals over signal paths that carry digital data streams representing various types of information.

Network link 420 typically provides electrical, electromagnetic, or optical data communication directly or through at least one network to other data devices, using, for example, satellite, cellular, Wi-Fi, or BLUETOOTH technology. For example, network link 420 may provide a connection through a network 422 to a host computer 424.

Furthermore, network link 420 may provide a connection through network 422 or to other computing devices via internetworking devices and/or computers that are operated by an Internet Service Provider (ISP) 426. ISP 426 provides data communication services through a world-wide packet data communication network represented as internet 428. A server computer 430 may be coupled to internet 428. Server 430 broadly represents any computer, data center, virtual machine or virtual computing instance with or without a hypervisor, or computer executing a containerized program system such as DOCKER or KUBERNETES. Server 430 may represent an electronic digital service that is implemented using more than one computer or instance and that is accessed and used by transmitting web services requests, uniform resource locator (URL) strings with parameters in HTTP payloads, API calls, app services calls, or other service calls.

Computing device 400 and server 430 may form elements of a distributed computing system that includes other computers, a processing cluster, server farm or other organization of computers that cooperate to perform tasks or execute applications or services. Server 630 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 430 may comprise a web application server that hosts a presentation layer, application layer and data storage layer such as a relational database system using structured query language (SQL) or NoSQL, an object store, a graph database, a flat file system or other data storage.

Computing device 400 can send messages and receive data and instructions, including program code, through a network, network link 420 and communication interface 418. In the Internet example, server 430 might transmit a requested code for an application program through Internet 428, ISP 426, local network 422 and communication interface 418. The received code may be executed by processor 404 as it is received, or stored in storage 410, or other non-volatile storage for later execution.

Basic Software System

Figure 5:
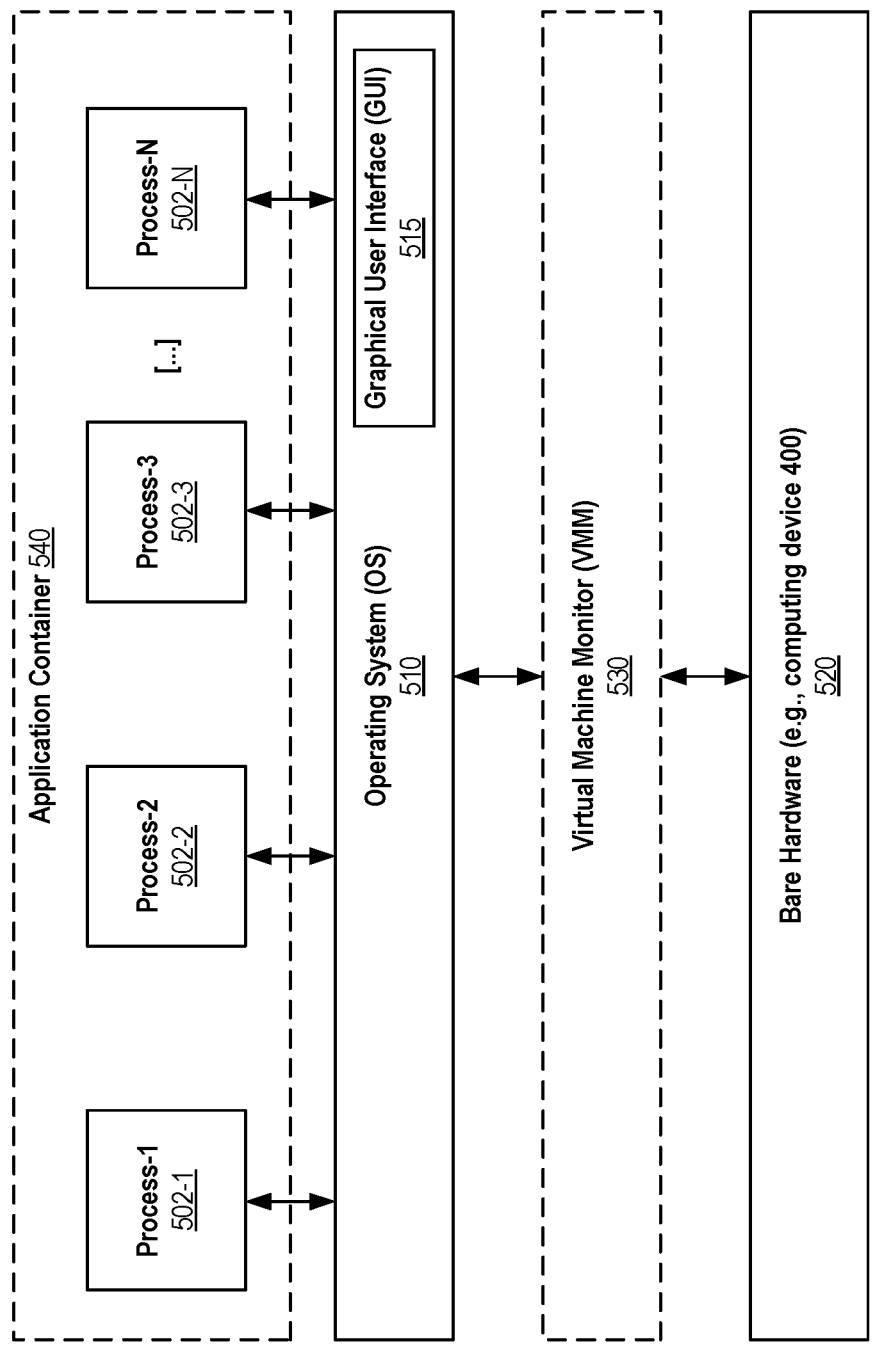
FIG. 5 is a block diagram of an example basic software system that may be employed for controlling the operation of the basic computing device of FIG. 4.

FIG. 5 is a block diagram of an example basic software system 500 that may be employed for controlling the operation of computing device 400 of FIG. 4. Software system 500 and its components, including their connections, relationships, and functions, is meant to be an example only, and not meant to limit implementations of the techniques. Other software systems suitable for implementing the techniques may have different components, including components with different connections, relationships, and functions.

Software system 500 is provided for directing the operation of computer system 400. Software system 500, which may be stored in system memory (RAM) 406 and on fixed storage (e.g., hard disk or flash memory) 410, includes a kernel or operating system (OS) 510.

OS 510 manages low-level aspects of computer operation, including managing execution of processes, represented as 502-1, 502-2, 502-3 . . . 502-N, memory allocation, file input and output (I/O) and device I/O. One or more application programs may be "loaded" (e.g., transferred from fixed storage 410 into memory 406) for execution as one or more processes by the system 500. The applications or other software intended for use on computing device 400 may also be stored as a set of downloadable computer-executable instructions, for example, for downloading and installation from an Internet location (e.g., a Web server, an app store or other online service).

The execution of application program instructions may implement a process (e.g., 502-2) in the form of an instance of a computer program that is being executed and consisting of program code and its current activity. Depending on the operating system (OS), a process (e.g., 502-3) may be made up of multiple threads of execution that execute instructions concurrently. In this context, a computer program is a passive collection of instructions, while a process (e.g., 502-1) may be the actual execution of those instructions. Several processes (e.g., 502-1 and 502-2) may be associated with the same program; for example, opening up several instances of the same program often means more than one process is being executed, or a program that initially launches as a single process may subsequently spawn (e.g., fork) additional processes.

OS 510 may implement multitasking to allow processes 502-1, 502-2, 502-3 . . . 502-N to share processor 404. While each processor 404 or core of the processor executes a single task at a time, computing device 400 may be programmed to implement multitasking to allow each processor to switch between tasks that are being executed without having to wait for each task to finish. Switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. For security and reliability, OS 510 may prevent direct communication between independent processes, providing strictly mediated and controlled inter-process communication functionality.

In some instances, processes 502-1, 502-2, 502-3 . . . 502-N and the application programs they implement may execute within application container 540. Application containers generally are a mode of operation of OS 510 in which OS 510 allows the existence of multiple isolated user space instances to run on OS 510. Application container 540 is an example of one such instance. The instances themselves are sometimes alternatively referred to as zones, virtual private servers, partitions, virtual environments, virtual kernels, or jails. Application containers provide a mechanism whereby finite hardware computing resources such as CPU time and storage media space can be allocated among the instances.

Software system 500 includes a graphical user interface (GUI) 515, for receiving user commands and data in a graphical (e.g., "point-and-click" or "touch gesture") fashion. These inputs, in turn, may be acted upon by system 500 in accordance with instructions from operating system 510 or processes 502-1, 502-2, 502-3 . . . 502-N. GUI 515 also serves to display the results of operation from OS 510 and processes 502-1, 502-2, 502-3 . . . 502-N 502, whereupon the user may supply additional inputs or terminate the session (e.g., log off).

OS 510 can execute directly on bare hardware 520 (e.g., processor 404) of computing device 400. Alternatively, a hypervisor or virtual machine monitor (VMM) 530 may be interposed between bare hardware 520 and OS 510. In this configuration, VMM 530 acts as a software "cushion" or virtualization layer between OS 510 and bare hardware 520 of computing device 400.

VMM 530 instantiates and runs one or more virtual machine instances ("guest machines"). Each guest machine comprises a "guest" operating system, such as OS 510, and one or more applications, such as applications 502, designed to execute on the guest operating system. VMM 530 presents the guest operating systems with a virtual operating platform and manages the execution of the guest operating systems.

In some instances, VMM 530 may allow a guest operating system to run as if it is running on bare hardware 520 of computing device 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530. In these instances, the guest operating system is "aware" that it executes on a virtual machine monitor. In other words, VMM 530 may provide para-virtualization to a guest operating system in some instances.

Cloud Computing

The techniques may be implemented in a "cloud computing" environment. The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements.

For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (e.g., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (e.g., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

Other Aspects of the Disclosure

Unless the context clearly indicates otherwise, the term "or" is used in the foregoing specification and in the appended claims in its inclusive sense (and not in its exclusive sense) so that when used, for example, to connect a list of elements, the term "or" means one, some, or all of the elements in the list.

Unless the context clearly indicates otherwise, the terms "comprising," "including," "having," "based on," "encompassing," and the like, are used in the foregoing specification and in the appended claims in an open-ended fashion, and do not exclude additional elements, features, acts, or operations.

Unless the context clearly indicates otherwise, conjunctive language such as the phrase "at least one of X, Y, and Z," is to be understood to convey that an item, term, etc. may be either X, Y, or Z, or a combination thereof. Thus, such conjunctive language is not intended to require by default implication that at least one of X, at least one of Y and at least one of Z to each be present.

Unless the context clearly indicates otherwise, as used in the foregoing detailed description and in the appended claims, the singular forms "a," "an," and "the" are intended to include the plural forms as well.

Unless the context clearly indicates otherwise, in the foregoing detailed description and in the appended claims, although the terms first, second, etc. are, in some instances, used herein to describe various elements, these elements should not be limited by these terms. These terms are only used to distinguish one element from another. For example, a first computing device could be termed a second computing device, and, similarly, a second computing device could be termed a first computing device. The first computing device and the second computing device are both computing devices, but they are not the same computing device.

In the foregoing specification, the techniques have been described with reference to numerous specific details that may vary from implementation to implementation. The specification and drawings are, accordingly, to be regarded in an illustrative rather than a restrictive sense.

The invention claimed is:

1. A computer-implemented method comprising:
   extracting a documentation fragment from a common specification of a library, the common specification comprising a source code in a source programming language;
   identifying a first structured text within an interrupted text of the documentation fragment, wherein the interrupted text comprises clearly structured text or prose, and wherein the interrupted text comprises only clearly structured text or prose if the first structured text is replaced with clearly structured text or prose;
   translating the first structured text to a plurality of different structured texts for a plurality of different target programming languages, each different structured text of the plurality of different structured texts comprising a respective machine-readable text in a respective different target programming language of the plurality of different target programming languages; and
   producing a plurality of different documentation outputs for the plurality of different target programming languages, wherein each documentation output of the plurality of different documentation outputs comprises a respective structured text of the plurality of different structured texts for a target programming language of the plurality of different target programming languages for which said documentation output is produced.

2. The computer-implemented method of claim 1, wherein translating the first structured text to a particular structured text of the plurality of different structured texts is based on:
   determining that the first structured text refers to a value specified in the source code in the source programming language of the common specification;
   obtaining the value in the source code in the source programming language of the common specification; and
   forming the particular structured text based at least on the value.

3. The computer-implemented method of claim 2, wherein forming the particular structured text of the plurality of different structured texts based on the value is based on:
   translating the value to a different but equivalent value; and
   including the different but equivalent value in the particular structured text.

4. The computer-implemented method of claim 1, wherein:
   translating the first structured text to a particular structured text of the plurality of different structured texts is based on determining that the first structured text refers to a first named type of building block of the common specification, the first named type of building block provided by the source programming language for crafting an interface in the source programming language; and the particular structured text comprises a reference to a second named type of building block of a source code in a particular target programming language of the plurality of different target programming languages, the second named type of building block of the source code in the particular target programming language generated based on the first named type of building block of the common specification, the second named type of building block in the particular target programming language provided by the particular target programming language for crafting an interface in the particular target programming language.

5. The computer-implemented method of claim 4, wherein the reference is a hyperlink.

6. The computer-implemented method of claim 4, wherein the first named type of building block provided by the source programming language for crafting an interface in the source programming language is a class.

7. The computer-implemented method of claim 4, wherein the second named type of building block in the particular target programming language provided by the particular target programming language for crafting an interface in the particular target programming language is a member function of a class.

8. The computer-implemented method of claim 1, further comprising:

automatically invoking a documentation generator for a particular target programming language of the plurality of different target programming languages to generate documentation from a documentation output of the plurality of different documentation outputs, wherein the generated documentation conforms to expectations of programmers in a community for the particular target programming language.

9. The computer-implemented method of claim 1, wherein:

the interrupted text is a first interrupted text;
the first structured text has a particular location in the first interrupted text;
a particular documentation output of the plurality of different documentation outputs comprises a second interrupted text; and
the particular documentation output is produced so that a particular structured text of the plurality of different structured texts has a particular location in the second interrupted text that is semantically equivalent to the particular location of the first structured text in the first interrupted text.

10. The computer-implemented method of claim 1, wherein:

the first structured text comprises a first usage example in a documentation fragment language; and
a particular structured text of the plurality of different structured texts comprises a second usage example in a particular target programming language of the plurality of different target programming languages, the second usage example being functionality equivalent to the first usage example.

11. The computer-implemented method of claim 10, further comprising:

identifying a common concept in the first usage example;
using a common concept corpus for the particular target programming language to translate the common concept in the first usage example to a functionally equivalent common concept in the particular target programming language; and
including the functionally equivalent common concept in the second usage example.

12. The computer-implemented method of claim 1, wherein the common specification is a first common specification; and wherein translating the first structured text to a particular structured text of the plurality of different structured texts is based on:

determining that the first structured text refers to a first named type of building block of a second common specification, the first named type of building block provided by the source programming language for crafting an interface in the source programming language; and wherein the particular structured text comprises a reference to a second named type of building block of a source code in a particular target programming language of the plurality of different target programming languages, the source code derived from the second common specification, the second named type of building block of the source code in the particular target programming language generated based on the first named type of building block of the second common specification, the second named type of building block in the particular target programming language provided by the particular target programming language for crafting an interface in the particular target programming language.

13. The computer-implemented method of claim 1, wherein:

the interrupted text is a first interrupted text;
the first interrupted text comprises a first prose in a first human language;
the first structured text has a particular location in the first interrupted text relative to the first prose;
a particular documentation output of the plurality of different documentation outputs comprises a second interrupted text;
the method further comprises translating the first prose to a second prose in a second human language; and
the particular documentation output is produced so that the respective structured text of the particular documentation output has a particular location in the second interrupted text relative to the second prose that is semantically equivalent to the particular location of the first structured text in the first interrupted text relative to the first prose.

14. One or more non-transitory storage media storing instructions which, when executed by one or more computing devices, cause the one or more computing devices to perform:

extracting a documentation fragment from a common specification of a library, the common specification comprising a source code in a source programming language;
identifying a structured text within an interrupted text of the documentation fragment, wherein the interrupted text comprises clearly structured text or prose, and wherein the interrupted text comprises only clearly structured text or prose if the structured text is replaced with clearly structured text or prose;

translating the structured text to a plurality of different structured texts for a plurality of different target programming languages, each different structured text of the plurality of different structured texts comprising a respective machine-readable text in a respective different target programming language of the plurality of different target programming languages; and producing a plurality of different documentation outputs for the plurality of different target programming languages, wherein each documentation output of the plurality of different documentation outputs comprises a respective structured text of the plurality of different structured texts for a corresponding target programming language of the plurality of different target programming languages for which said documentation output is produced.

15. The one or more non-transitory storage media of claim 14, further comprising instructions which, when executed by the one or more computing devices, cause the one or more computing devices to perform:

for each of at least two target programming languages of the plurality of different target programming languages, automatically invoking a documentation generator for the target programming language to generate documentation from the documentation output produced for the target programming language, wherein the generated documentation conforms to expectations of programmers in the target programming language community.

16. The one or more non-transitory storage media of claim 14, further comprising instructions which, when executed by the one or more computing devices, cause the one or more computing devices to perform:

identifying in the structured text a usage example expressed in a documentation fragment language;

identifying in the structured text an expected output of the usage example;

for each target programming language of the plurality of different target programming languages, deriving a source code in the target programming language based on the source code in the source programming language of the common specification;

for each target programming language of the plurality of different target programming languages, generating a library for the target programming language based on the source code in the target programming language;

for each target programming language of at least two target programming languages of the plurality of different target programming languages, deriving a usage example expressed in the target programming language based on the usage example expressed in the documentation fragment language;

for each target programming language of the at least two target programming languages of the plurality of different target programming languages, generating a test program for the target programming language based on the usage example expressed in the target programming language and the library for the target programming language; and for each target programming language of the at least two target programming languages of the plurality of different target programming languages, executing the test program for the target programming language, comparing an output of the test program execution to the expected output, and outputting a result of the comparing to a user interface, file, or database.

17. The one or more non-transitory storage media of claim 14, wherein the plurality of different target programming languages comprises at least one of the following programming languages: C, JAVA, PYTHON, C++, C#, JAVASCRIPT, PHP, SWIFT, R, LISP, FORTRAN, ADA, PASCAL, GROOVY, RUBY, GO, OBJECTIVE-C, DART, SCALA, or LUA.

18. A system comprising:
one or more processors;
storage media; and
instructions stored in the storage media and which, when executed by the one or more processors, cause the one or more processors to perform:
extracting a documentation fragment from a common specification of a library, the common specification comprising a source code in a source programming language;
identifying a first structured text within a interrupted text of the documentation fragment, wherein the interrupted text comprises clearly structured text or prose, and wherein the interrupted text comprises only clearly structured text or prose if the first structured text is replaced with clearly structured text or prose;
translating the first structured text to a plurality of different structured texts for a plurality of different target programming languages, each different structured text of the plurality of different structured texts comprising a respective machine-readable text in a respective different target programming language of the plurality of different target programming languages; and
producing a plurality of different documentation outputs for the plurality of different target programming languages, wherein each documentation output of the plurality of different documentation outputs comprises a respective structured text of the plurality of different structured texts for a target programming language of the plurality of different target programming languages for which said documentation output is produced.

19. The system of claim 18, further comprising instructions stored in the storage media and which, when executed by the one or more processors, cause the one or more processors to perform:
determining that the first structured text refers to a value specified in the source code in the source programming language of the common specification;
obtaining the value in the source code in the source programming language of the common specification; and
forming a particular structured text of the plurality of different structured texts based at least on the value.

20. The system of claim 19, further comprising instructions stored in the storage media and which, when executed by the one or more processors, cause the one or more processors to perform:
translating the value to a different but equivalent value; and
including the different but equivalent value in the particular structured text.

* * * * *